US011418757B1

(12) United States Patent
Parampottil et al.

(10) Patent No.: US 11,418,757 B1
(45) Date of Patent: Aug. 16, 2022

(54) CONTROLLED-ENVIRONMENT FACILITY VIDEO COMMUNICATIONS MONITORING SYSTEM

(71) Applicant: Securus Technologies, LLC, Carrollton, TX (US)

(72) Inventors: Isaac Parampottil, Coppell, TX (US); Mark Lester, Roanoke, TX (US); Amit Kumar Shrivastava, Montréal (CA); Scott Passe, Forney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 17/126,905

(22) Filed: Dec. 18, 2020

Related U.S. Application Data

(63) Continuation-in-part of application No. 16/534,709, filed on Aug. 7, 2019, now Pat. No. 10,893,232, which is a continuation of application No. 15/941,062, filed on Mar. 30, 2018, now Pat. No. 10,447,968.

(51) Int. Cl.
*H04N 7/14* (2006.01)
*G11B 27/34* (2006.01)
*G06V 40/20* (2022.01)

(52) U.S. Cl.
CPC ............ *H04N 7/147* (2013.01); *G06V 40/20* (2022.01); *G11B 27/34* (2013.01)

(58) Field of Classification Search
CPC combination set(s) only.
See application file for complete search history.

(56) References Cited

U.S. PATENT DOCUMENTS

| 8,836,752 | B2 | 9/2014 | Croak et al. |
| 9,007,420 | B1 | 4/2015 | Passe |
| 9,106,789 | B1 | 8/2015 | Shipman, Jr. et al. |
| 9,160,866 | B1 * | 10/2015 | Keiser .................. H04M 15/56 |
| 9,723,040 | B1 | 8/2017 | Lubbehusen et al. |
| 2005/0114192 | A1 | 5/2005 | Tor et al. |
| 2009/0070034 | A1 | 3/2009 | Oesterling et al. |
| 2012/0099716 | A1 | 4/2012 | Rae et al. |
| 2012/0281058 | A1 | 11/2012 | Laney et al. |
| 2013/0132462 | A1 * | 5/2013 | Moorer ............ H04N 21/47217 |
| | | | 709/203 |

(Continued)

*Primary Examiner* — Phung-Hoang J Nguyen
(74) *Attorney, Agent, or Firm* — Fogarty LLP

(57) ABSTRACT

Video communications of residents of a controlled-environment facility are monitored to detect instances of inappropriate behavior within the video, such as nudity. Residents may participate in live video visitation sessions with non-residents. Video recordings are generated for each video feed of the live video visitation. During the live video visitation, indications of inappropriate behavior displayed in the live video are detected. If indications of inappropriate behavior are detected in the live video, the recorded video is annotated to specify the locations of the detected indications in the recording. Upon completion of the video visitation session, post-processing of the recorded video detects additional indications of inappropriate behavior. The additional indications may be detected at proximal locations to the annotations and may be detected based on sampling frames of the recording to detect changes in the occurrence of pixels having a skin tone color.

18 Claims, 5 Drawing Sheets

(56) References Cited

U.S. PATENT DOCUMENTS

| | | | |
|---|---|---|---|
| 2013/0283401 A1* | 10/2013 | Pabla | G06F 21/60 |
| | | | 726/30 |
| 2014/0063174 A1 | 3/2014 | Junuzovic et al. | |
| 2014/0334610 A1 | 11/2014 | Hangsleben | |
| 2015/0138223 A1 | 5/2015 | Sorkine et al. | |
| 2017/0238842 A1* | 8/2017 | Jacquel | A61B 5/14542 |
| 2017/0324991 A1* | 11/2017 | Hodge | H04N 21/43615 |
| 2018/0024976 A1* | 1/2018 | Joo | G06F 16/5866 |
| | | | 715/230 |
| 2018/0293682 A1 | 10/2018 | Hodge | |
| 2019/0037247 A1 | 1/2019 | Hodge | |
| 2019/0160382 A1* | 5/2019 | Miyaki | G06F 3/011 |

\* cited by examiner

CONTROLLED-ENVIRONMENT FACILITY VIDEO COMMUNICATIONS MONITORING SYSTEM

CROSS-REFERENCE TO RELATED APPLICATIONS

This application is continuation-in-part of co-pending, commonly assigned U.S. patent application Ser. No. 16/534,709, filed Aug. 7, 2019, which issued as U.S. Pat. No. 10,893,232 B1, and which is a continuation of U.S. Pat. No. 10,447,968 B1, filed on Mar. 30, 2018, the disclosures of which are hereby incorporated herein by reference.

TECHNICAL FIELD

The following description relates generally to communication services provided to residents of a controlled-environment facility, and more particularly to monitoring of video communication services provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may be provided with opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide residents with various types of remote communications sessions as visitation sessions, including voice and video conferences, text communications, email, and online chat sessions.

Providing visitation sessions includes the significant challenge of preventing and detecting unauthorized activity during the visitation sessions. This challenge is made more difficult with the introduction of video visitation sessions in which the participants view each other via live audio and video feeds. The audio portion of a video visitation session may be monitored similarly to audio from traditional voice visitation sessions. For instance, the audio may be monitored live and/or recorded and analyzed to identify various types of unauthorized or suspicious activity, such as identifying keywords of interest or detecting the presence of voices from unauthorized participants.

Video visitations include the additional difficulty of detecting participants passing non-verbal messages via the video feed portion of the visitation session. For instance, during a video visitation session, one of the participants may hold up written notes for the other participant to see and read. The participant may hold up notes that may be typed or handwritten and may be written on surfaces that range from paper notes to notes that are drawn on the hand of a participant. Participants are also able to communicate non-verbally via hand signals and gestures that may range from a sign language to gang signs. In this manner, the participants can communicate silently, thus avoiding detection by audio monitoring tools. In certain scenarios, the non-verbal message need only be displayed long enough for the recipient to capture an image of the displayed message, with the recipient free to review the image in detail at a later time.

Inappropriate behavior, such as nudity or flashing (i.e., exposure of an individual's genitals to another), is another problem that arises during video visitation sessions involving residents of controlled environment facilities. Such behavior can occur on both the resident and non-resident sides of a video connection. Current solutions to prevent or stop such behavior require active monitoring of the video visitation sessions. This requires the facilities to provide extra resources such as personnel and equipment for monitoring the video connections, which adds costly overhead to the video visitation services.

BRIEF SUMMARY

In an example embodiment, an image processor may use a combination of color or skin tone pixilation and form or shape identification to detect when a participant on a video communication breaks nudity rules for a controlled environment facility. The image processor refers to a database of body shapes, parts, or profiles to find similar elements in an image. The image processor determines the skin tone colors in the shapes to determine if an inappropriate body part is exposed. The image processor may use facial recognition software to disqualify the facial regions and prevent false positives on areas of an image where skin tones are expected. The system may detect skin exposure during video communications from either the inmate/resident side of the communication or the external side. The system may notify the facility and/or block the content of the video communication.

In various embodiments, a system monitors video communications provided to a resident of a controlled-environment facility. The system includes a communication system configured to host a live video visitation between the resident and one or more non-residents, wherein the video visitation comprises a plurality of live video feeds. The system further includes a video feed recording system configured to generate a plurality of video recordings, each video recording corresponding to a live video feed of the plurality of live video feeds. The system further includes a live video processing system configured to, concurrent with the live video visitation, detect indications of a non-verbal communication or inappropriate behavior displayed in a first live video feed of the plurality of live video feeds; and annotate a first video recording corresponding to the first live video feed, wherein the annotations specify the locations of the detected indications of the non-verbal communication or inappropriate behavior displayed in the first video recording. The system further includes a video post-processing system configured to, upon completion of the live video visitation, detect additional indications of the non-verbal communication or inappropriate behavior displayed in the first video recording.

In certain additional embodiments of the system, the additional indications of the non-verbal communication or inappropriate behavior are detected at proximal locations to the locations specified in the annotations of the first video recording. In certain additional embodiments of the system, the live video processing system is further configured to detect indications of the non-verbal communication or inappropriate behavior in the first live video feed by sampling a plurality of frames from the first live video feed. In certain additional embodiments of the system, a color balance is determined for each of the frames sampled from the first live video feed. In certain additional embodiments of the system, the live video processing system is further configured to detect the display of a message surface in the first live video feed based on changes in the color balance within a sequence of successive frames of the plurality of sampled frames. In certain additional embodiments of the system, the live video processing system is further configured to detect indications of the non-verbal communication or inappropriate behavior in the first live video feed by detecting movement by a participant in the first live video feed. In certain additional embodiments of the system, the movement is detected based on a frame rate of the first live video feed. In certain additional embodiments of the system, the movement is detected based on a compression efficiency associated with the first live video feed.

In various embodiments, a method is provided for monitoring video communications by a resident of a controlled-environment facility. The method includes hosting a live video visitation between the resident and one or more non-residents, wherein the video visitation comprises a plurality of live video feeds; generating a plurality of video recordings, each video recording corresponding to a live video feed of the plurality of live video feeds; detecting, concurrent with the live video visitation, indications of non-verbal communication or inappropriate behavior displayed in a first live video feed of the plurality of live video feeds; annotating a first video recording corresponding to the first live video feed, wherein the annotations specify the locations of the detected indications of the non-verbal communication or inappropriate behavior displayed in the first video recording; and detecting, upon completion of the live video visitation, additional indications of the non-verbal communication or inappropriate behavior displayed in the first video recording.

In certain additional embodiments of the method, the additional indications of the non-verbal communication or inappropriate behavior are detected at proximal locations to the locations specified in the annotations of the first video recording. In certain additional embodiments of the method, the indications of the non-verbal communication or inappropriate behavior in the first live video feed are detected by sampling a plurality of frames from the first live video feed. In certain additional embodiments of the method, a color balance is determined for each of the frames sampled from the first live video feed. In certain additional embodiments, the method further includes detecting the display of a message surface in the first live video feed based on changes in the color balance within a sequence of successive frames of the plurality of sampled frames. In certain additional embodiments of the method, the indications of the non-verbal communication or inappropriate behavior in the first live video feed are detected by detecting movement by a participant in the first live video feed. In certain additional embodiments of the method, the movement is detected based on a frame rate of the first live video feed. In certain additional embodiments of the method, the movement is detected based on a compression efficiency associated with the first live video feed.

In various embodiments, a computer-readable storage device includes program instructions stored thereon for monitoring video communications by a resident of a controlled-environment facility. Upon execution by one or more processors, the program instructions cause the one or more processors to: host a live video visitation between the resident and one or more non-residents, wherein the video visitation comprises a plurality of live video feeds; generate a plurality of video recordings, each video recording corresponding to a live video feed of the plurality of live video feeds; detect, concurrent with the live video visitation, indications of a non-verbal communication or inappropriate behavior displayed in a first live video feed of the plurality of live video feeds; annotate a first video recording corresponding to the first live video feed, wherein the annotations specify the locations of the detected indications of the non-verbal communication or inappropriate behavior displayed in the first video recording; and detect, upon completion of the live video visitation, additional indications of the non-verbal communication or inappropriate behavior displayed in the first video recording.

In certain additional embodiments of the computer-readable storage device, the program instructions further cause the one or more processors to detect the indications of the non-verbal communication or inappropriate behavior in the first live video feed by sampling a plurality of frames from the first live video feed at proximal locations to the locations specified in the annotations of the first video recording and determining a color balance for each of the frames sampled from the first live video feed. In certain additional embodiments of the computer-readable storage device, the program instructions further cause the one or more processors to detect the display of a message surface in the first live video feed based on changes in the color balance within a sequence of successive frames of the plurality of sampled frames. In certain additional embodiments of the computer-readable storage device, the program instructions further cause the one or more processors to detect indications of the non-verbal communication or inappropriate behavior in the first live video feed by detecting movement by a participant in the first live video feed, wherein the movement is detected based on a frame rate of the first live video feed.

When indications of the inappropriate behavior are detected in a video feed, a predetermined action may be triggered. The inappropriate behavior may be full or partial nudity or non-verbal communication. The predetermined action may include, for example, alerting controlled-environment facility staff, terminating the first video feed, and marking the first video feed with an indication that inappropriate behavior is being detected. The indication of inappropriate behavior may be detected based upon the identification of predetermined forms or shapes in one or more frames of the first video feed, such as forms or shapes corresponding to human body parts.

BRIEF DESCRIPTION OF THE DRAWINGS

Figure 1:
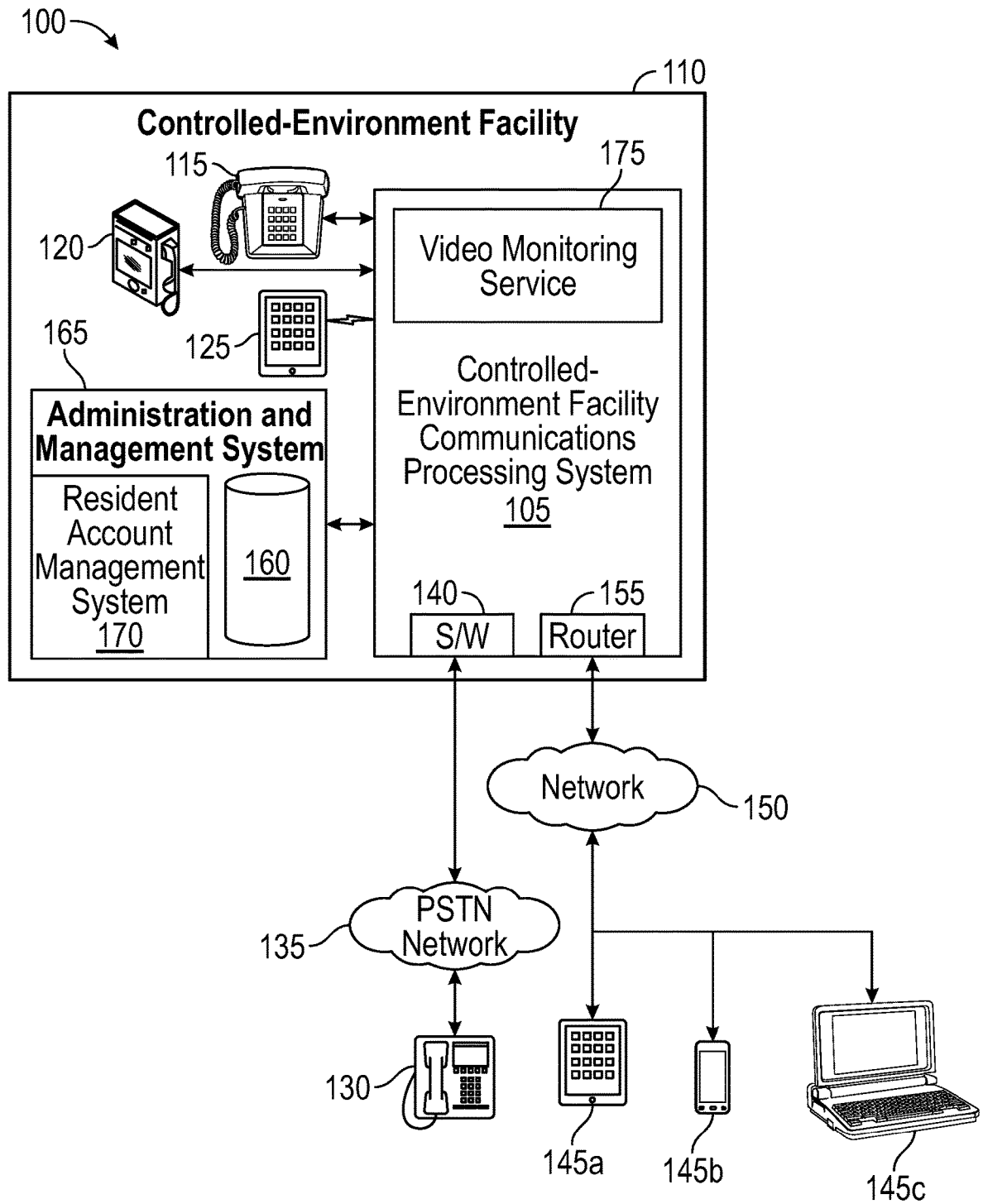

Having thus described the invention in general terms, reference will now be made to the accompanying drawings, which are not necessarily drawn to scale, and wherein:

FIG. 1 is a diagram illustrating certain components of a communication system according to various embodiments for monitoring video communication services provided to residents of a controlled-environment facility.

Figure 2:
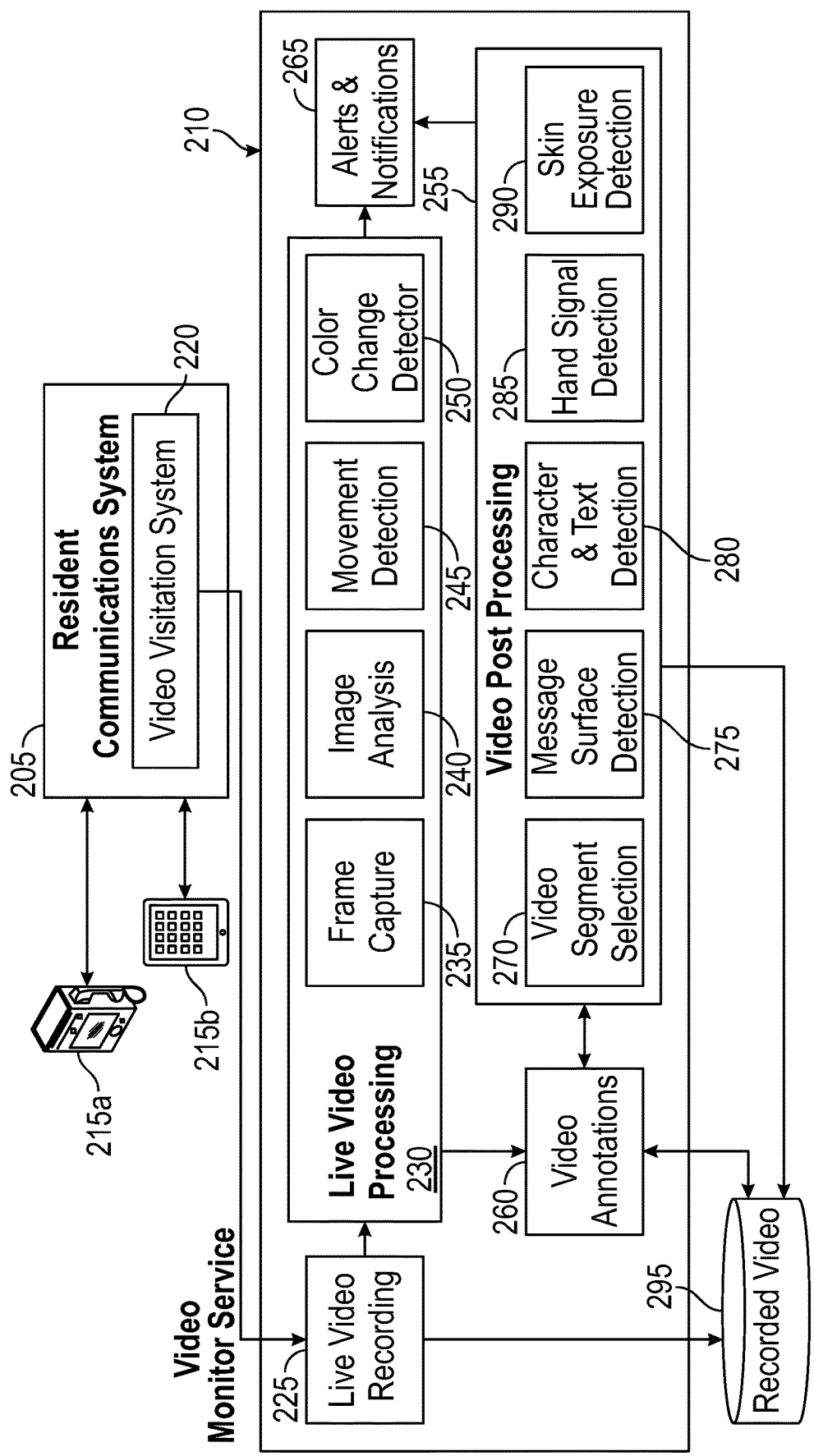

FIG. 2 is a diagram illustrating certain components of a monitoring system according to various embodiments for monitoring video communication services provided to residents of a controlled-environment facility.

Figure 3:
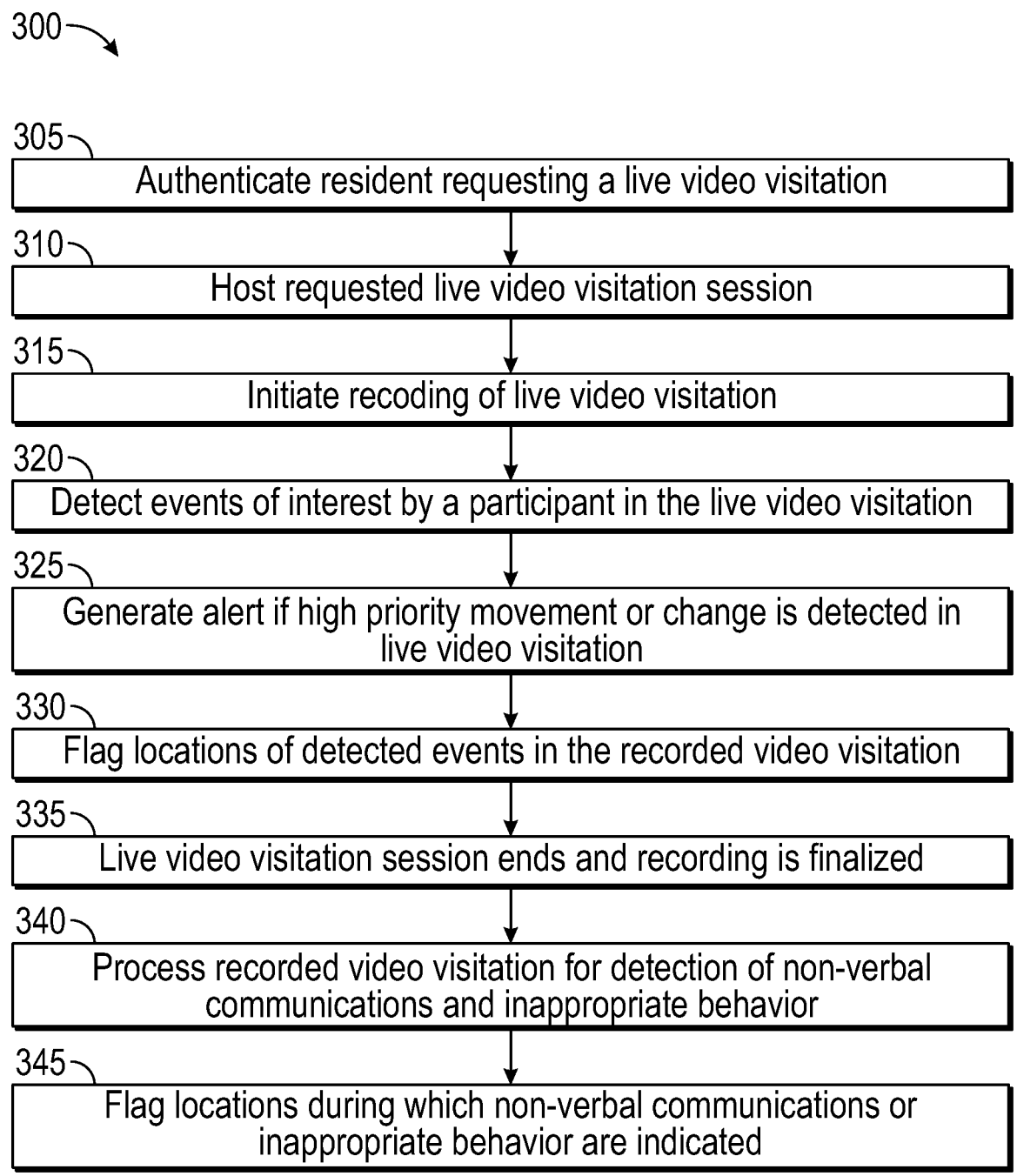

FIG. 3 is a flowchart diagram illustrating certain steps of a process according to various embodiments for monitoring video communication services provided to residents of a controlled-environment facility.

Figure 4:
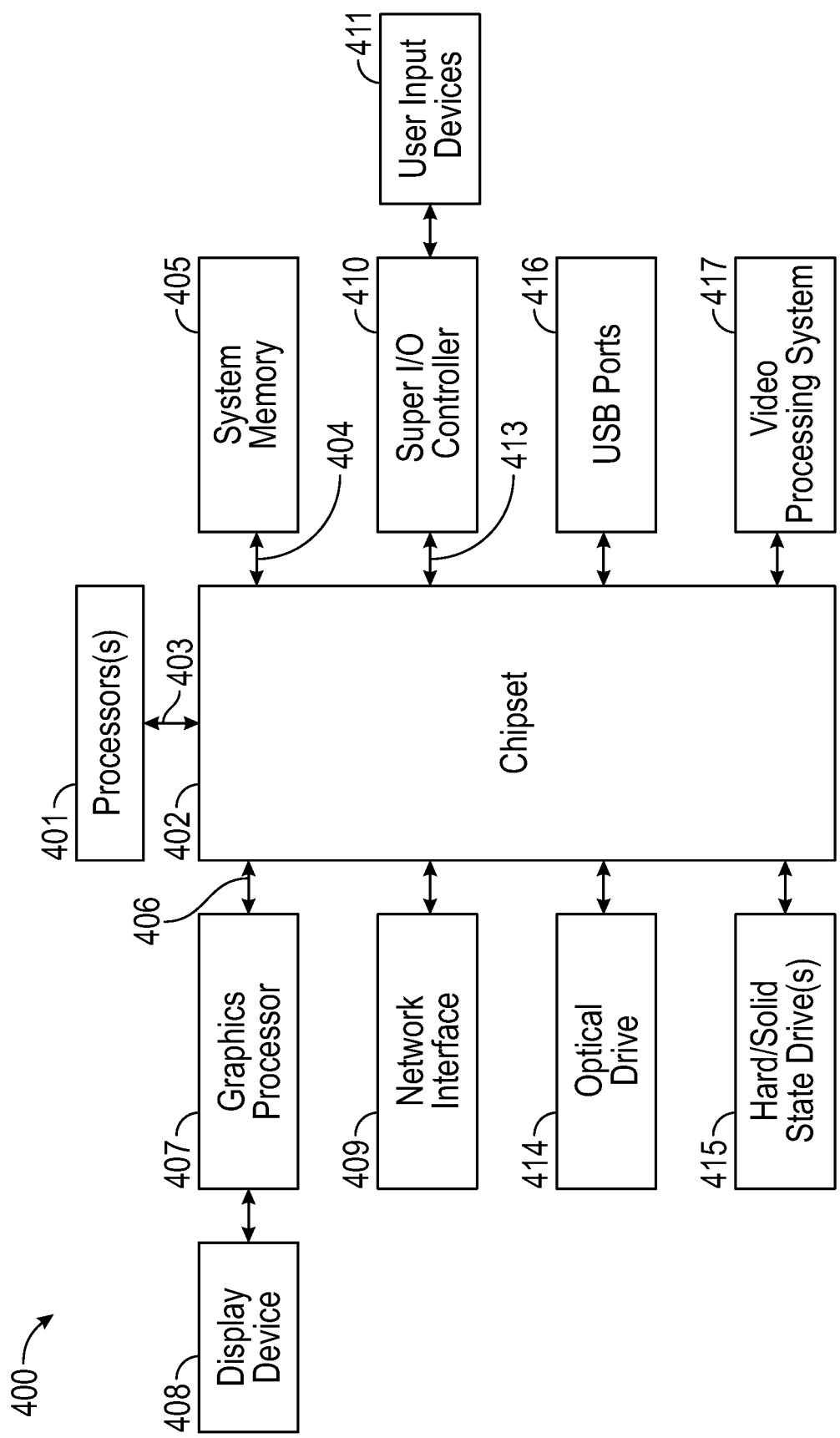

FIG. 4 is a block diagram illustrating certain components of a communication processing system used for monitoring video communication services provided to residents of a controlled-environment facility according to various embodiments.

Figure 5:
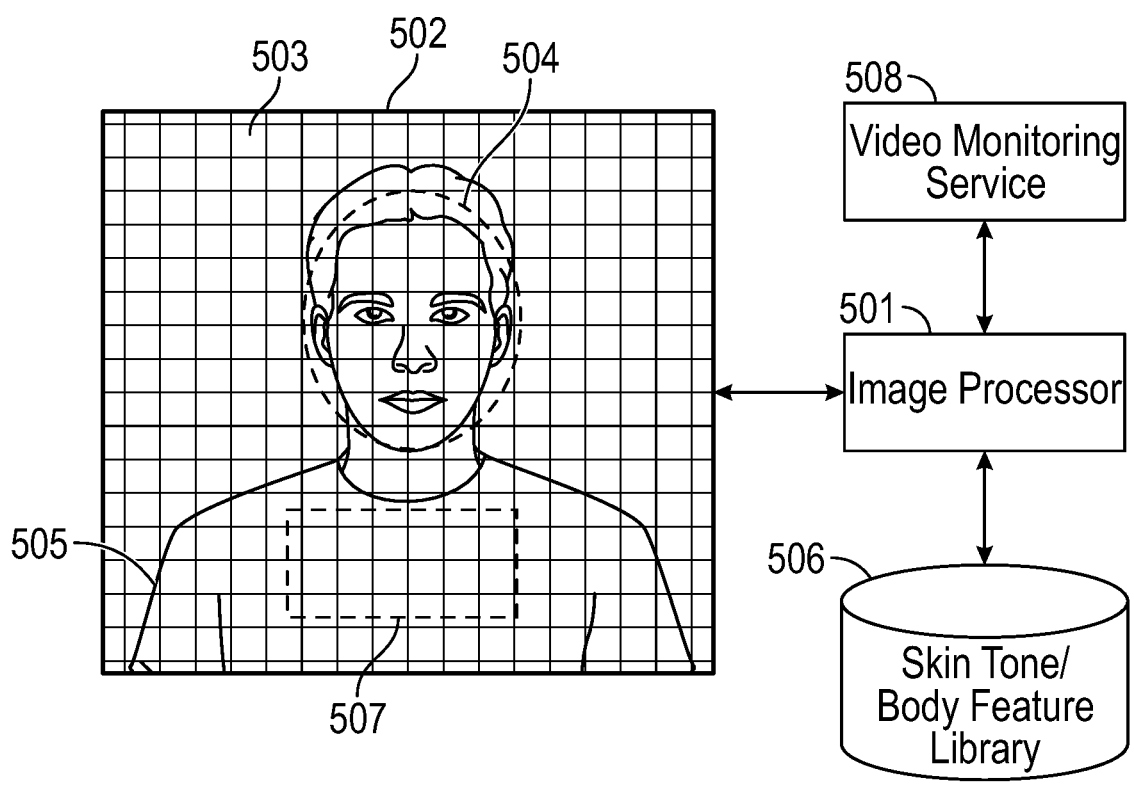

FIG. 5 illustrates an example system for identifying color changes in a video communication, which may indicate inappropriate behavior.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, offenders or detainees. It should be understood, however, that the systems and methods described herein may be similarly applicable to other types of controlled-environment facilities and their respective residents (e.g., a hospital and its patients, a school dormitory, and its students, etc.).

FIG. 1 is a diagram illustrating certain components of a communications system 100 provided within a controlled-environment facility 110 according to various embodiments. As illustrated, the communications system 100 includes a communications processing system 105. In a controlled-environment facility 110, the communications processing system 105 may be a system that provides inmates with multiple different communications services. For instance, communications processing system 105 may provide inmates with voice visitation services, video visitation services, email, online chats and/or text messaging services. The communications processing system 105 may include a video monitoring service 175 that provides various monitoring capabilities by which the resident's use of the provided video communication services may be recorded, analyzed, and monitored in order to identify instances of illicit or unauthorized use of the video communication services. As described in more detail with regard to FIG. 2, in certain embodiments, the video monitoring service 175 may implement procedures for monitoring video communication sessions in order to detect instances of participants displaying non-verbal communications or engaging in inappropriate behavior within the video feed of the video visitation session.

In some scenarios, such as the embodiment illustrated in FIG. 1, communications processing system 105 may be co-located within a controlled-environment facility 110. Alternatively, communications processing system 105 may be centrally and/or remotely located with respect to one or more controlled-environment facilities. Whether co-located or located remotely, communications processing system 105 may be used to provide communication services to inmates of multiple controlled-environment facilities. As described with respect to FIG. 4, in various embodiments, communications processing system 105 used to monitor video communication services may assume a variety of forms.

Residents of a controlled-environment facility 110 may use conventional telephones 115 to access certain voice communication services provided by the communications processing system 105. In various scenarios, access to conventional telephones 115 may be provided only to certain residents and/or in certain visitation areas provided by the controlled-environment facility 110. In certain embodiments, certain voice calls by staff of the controlled-environment facility 110 may be conducted using conventional telephones 115 that also utilize the communications processing system 105. Since conventional telephones 115 support only voice communications, communications conducted via these conventional telephones do not include video to be monitored using the described capabilities of the video monitoring service 175.

In certain embodiments, the communications processing system 105 may provide residents of the controlled-environment facility 110 with voice, video and/or text messaging communications services using a resident communications terminal 120. In certain scenarios, the resident communications terminal 120 may be mounted on a wall, within a booth, or as part of kiosk. In certain scenarios, the resident communications terminal 120 may be a hardened terminal and may be installed in an area of the controlled-environment facility 110 dedicated to providing residents with visitation sessions. In certain embodiments, resident communications terminal 120 may provide a resident with the ability to participate in voice calls and to participate in video visitation sessions. In certain embodiments, resident communications terminal 120 may include a character-entry interface that allows residents to participate in text message or similar text-based communication services such as email and chat sessions. In certain embodiments, a resident communications terminal 120 may be referred to as an Intelligent Facility Device (IFD). An IFD may be adapted to provide residents with various additional services, such as commissary and account management, in addition to voice, video and/or text communications sessions.

In various embodiments, a resident communications terminal 120 may include a video display, a camera, and a handset that includes a microphone and speakers. Other embodiments may utilize a resident communications terminal 120 that includes a handset but may alternatively or additionally utilize an independent speaker or microphone. The display may be any suitable electronic display such as, for example, a Liquid Crystal Display (LCD) or a touch-screen display (e.g., resistive, capacitive, etc.). The camera included on the resident communications terminal 120 may be any suitable imaging device such as, for instance, a video camera or webcam equipped with Charge-Coupled Devices (CCDs) or Complementary Metal—Oxide—Semiconductor (CMOS) active pixel sensors. A handset may be similar to a traditional telephone handset including an earpiece portion (with a speaker), a handle portion, and a mouthpiece portion (with a microphone). In certain embodiments, the resident communications terminal 120 may allow a resident to utilize a headset with earphones and a microphone in place of a traditional handset.

Resident communications terminal 120 may be configured to capture audio from the resident and to transmit the captured audio to a non-resident via the communications processing system 105. The resident audio may be captured using a microphone in the mouthpiece portion of the handset, a microphone installed within the enclosure of the terminal, an independent microphone, or by a microphone component of a headset. During a voice visitation session, the resident communications terminal 120 receives an audio signal from the non-resident, via the communications processing system 105, and plays the received audio for the resident using the earpiece portion of the handset. During a video visitation session, resident communications terminal 120 may be configured to capture video or images of the resident using the camera and, via the communications processing system 105, transmit the captured video or images to a non-resident. In certain embodiments, residents may utilize the resident communications terminals 120 to record text, voice and/or video messages to be made available to one or more non-residents. In certain embodiments, the camera of the resident communications terminals 120 may be utilized by residents to capture images that may then be included within or attached to text-based communications, such as email, chat, and text messages.

In certain embodiments, the communications processing system 105 may provide residents of the controlled-environment facility 110 with communication services using a portable communications device 125. In certain embodiments, portable communications device 125 may be a personal wireless device, such as a tablet computing device or smartphone device. As with the resident communications terminal 120, the portable communications device 125 may include a camera, display, microphone, and speakers and may be used by the resident for voice, video, and text-based visitation sessions. In certain scenarios, a portable communications device 125 may be referred to as an Intelligent Resident Device (IRD), or in a correctional institution environment, as an Intelligent Inmate Device (IID). In certain scenarios, a portable communications device 125 and/or a resident communications terminal 120 may be sponsored, or otherwise subsidized, by organizations or companies that have contracted with the controlled-environment facility 110 to provide communication services to residents of the facility.

In many scenarios, the portable communications device 125 may be especially adapted for use in controlled-environment facility. For instance, in a correctional facility, the portability of a portable communications device 125 may be limited by mounting the device on a wall, within a booth or as part of a kiosk. In certain scenarios, the portable communications device 125 may be protected within a hardened case that prevents any modifications to the hardware of the device. Various features of the hardware and/or software of the portable communications device 125 may be modified in order to prevent unauthorized use of the device. For instance, in a correctional institution, a portable communications device 125 may operate using a specially adapted operating system or operating system kernel. A portable communications device 125 may also be restricted with respect to the allowed software applications that may be used by a resident. The portable communications device 125 may also be configured to prevent the resident from installing or modifying any applications on the device, thus limiting the resident to the use of software programs authorized for use by the controlled-environment facility 110. The portable communication device 125 may be assigned for use by a resident on a temporary or permanent basis.

In various scenarios, a portable communications device 125 and/or a resident communications terminal 120 may provide a resident of the controlled-environment facility 110 with access to various software applications and services in addition to providing communication sessions. For example, residents may be provided with legal research and library services, education and training services, counseling services, employment search services, gaming applications, applications for playback of approved music and/or video files. In certain scenarios, a portable communications device 125 and/or a resident communications terminal 120 may provide a resident with access to commissary services provided by the controlled-environment facility 110. In certain scenarios, portable communications device 125 and/or a resident communications terminal 120 may include a web browser that may be modified to limit residents to access only secure websites and/or third-party websites of approved vendors. Portable communications device 125 and/or a resident communications terminal 120 may also provide residents with access to various services specific to the controlled-environment facility 110, such as requesting a scheduled visitation session and requesting medical appointments.

A portable communications device 125 may also be restricted with respect to the network connectivity that is afforded to a resident of the controlled-environment facility. In many scenarios, a portable communications device 125 may be configured to connect only to a network provided by the controlled-environment facility 110. A portable communications device 125 may be further restricted to only connect to networks available within certain areas within a controlled-environment facility 110, such as a dedicated visitation area or other supervised area. In certain scenarios, network connectivity for a portable communications device 125 may be limited by placing wireless access points and positioning directional antenna within the physical structure of the controlled-environment facility 110 such that the generated wireless signals are restricted to limited areas within the facility.

In many scenarios, use of a resident communications terminal 120 and a portable communications device 125 is limited based on security protocols implemented by the controlled-environment facility 110. For instance, a resident may be required to enter a PIN (Personal Identification Number) before being allowed to use a resident communications terminal 120 or a portable communications device 125. A resident may similarly be required to provide biometric verification, such as using a voice print, fingerprint, facial recognition, iris scan or other biometric indicator. Access to specific applications and services provided by a resident communications terminal 120 and a portable communications device 125 may also be limited to residents based on security protocols, thus requiring additional verification, such as a password, prior to allowing access to a resident.

A portable communications device 125 may provide residents with access to various types of communication services by which residents can communicate with non-residents. In various embodiments, residents may utilize the portable communications device 125 to record voice, video, and text-based messages to be made available to one or more non-residents. In certain scenarios, a portable communications device 125 may allow residents to participate in voice calls with non-residents using the audio capabilities of the device. During a live video visitation session, portable communications device 125 may be configured to capture video or images of the resident using the camera and, via the communications processing system 105, transmit the captured video or images to a non-resident. In various embodiments, portable communications device 125 may include applications that support text-based messages, including email, chat sessions, and text messaging. In certain embodiments, the camera of the portable communications device 125 may be utilized by residents to capture images that may then be included within or attached to text-based communications.

In the illustrated embodiment, the communications processing system 105 utilizes the administration and management system 165 in enforcing security protocols that are applicable to the use of communication services provided to residents of the controlled-environment facility 110. For instance, in providing visitation services, communication processing system 105 may limit a resident's visitation sessions to sessions with non-residents whose identities are listed in that resident's Pre-Approved Contact (PAC) and/or Personal-Allowed Number (PAN) list. In some scenarios, the communications processing system 105 may also enforce restrictions prohibiting a resident from contacting certain individuals identified in a "do not contact" list. In various scenarios, the identity of a non-resident may be identified based on the phone number of the non-resident, the device presented for use by a non-resident and/or the email addresses or other accounts used by the non-resident. Each resident's PAC, PAN, and/or do not contact list(s) may be stored, for example, in database 160 maintained by the administration and management system 165. In certain scenarios, database 160 may also be used to store biometric information used to authenticate individual residents of the controlled-environment facility 110. In addition to PAC, PAN, and/or do not contact list(s), administration, and management system 165 may also store other security profiles and rules that are applicable to each resident.

The administration and management system 165 may also include a resident account management system 170 that is used to manage information such as balances in a resident's trust, commissary and/or calling accounts. The resident account management system 170 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the account management system 170 may be one or more separate systems or may be integrated as a component of the administration and management system 165.

Using the communication services provided by the communication processing system 105, a resident may establish a communication session with one or more non-residents. In certain scenarios, a resident may call a non-resident that is using a telephone 130 or other communication device via a Publicly Switched Telephone Network (PSTN) 135. In the illustrated embodiment of the communication processing system 105, switch 140 may be used to connect voice visitation sessions with resident telephones 130 utilizing the PSTN 135. Additionally, or alternatively, the non-resident may establish a text, voice and/or video visitation session with a resident that is using a personal communication device 145a-c, which may be a tablet computing device 145a, mobile phone 145b, personal computer 145c, or other communication device. A communications session with a resident using a personal communication device 145a-c may be connected through a network 150 such as an Integrated Services Digital Network (ISDN), Voice-over-IP (VoIP) network, or packet data network (such as, for example the Internet) and/or a wireless communications network. Router 155 of communication processing system 105 may be used to route data packets associated with a communication session with personal communication device 145a-c. In certain scenarios, the personal communication device 145a-c used by the non-resident may include a camera, a display, a microphone, and a speaker thereby allowing the non-resident to participate in either voice or video communication sessions with a resident of the controlled-environment facility 110, including participating in video visitations and, in certain embodiments, exchanging video messages with non-residents.

In certain embodiments, communication processing system 105 may include a video monitoring service 175 that is configured to perform various monitoring operations related to video communication sessions. For instance, video monitoring service 175 may be configured to allow staff to monitor the audio and/or video feeds of a live video communication session. In addition, video monitoring service 175 may support the recording of video communication sessions, that may include generating and recording text, image, audio and/or video files resulting from the recording and processing of a video communication session. These recorded video communication files may be stored to the database 160 maintained by the administration and management system 165. In certain embodiments, video monitoring service 175 may provide access to various tools that can be used to search and analyze the recorded video communications sessions in support of investigative activities. For instance, as described in additional detail, video monitoring service 175 may implement procedures for monitoring communications that include video and/or images to detect instances of non-verbal communications or inappropriate behavior being displayed by participants within the video of the communications. The monitoring service 175 may include capabilities for identifying instances of events of interest within the video portion of a live video visitation session and analyzing the identified events of interest in post-visitation processing of the recorded visitation session.

In the embodiment of FIG. 1, the video monitoring service 175 is a component of the communication processing system 105. In certain embodiments, the video monitoring service 175 may be an external component of the communications processing system 105. One such embodiment is described with respect to FIG. 2. In certain embodiments, one or more of the functions of the video monitoring service 175 may be provided by systems external to the communication processing system 105. In certain of such embodiments, one or more of the functions of the video monitoring service 175 may be provided by centralized systems external to the controlled-environment facility 110.

In the embodiment of FIG. 2, the video monitoring service 210 provides similar functions as described with respect to the video monitoring service 175 of FIG. 1. In the embodiment illustrated in FIG. 2, the video monitoring service 210 is external to the communications system 205. In the illustrated embodiment, the video monitoring service 210 is comprised of components that interoperate to provide the described monitoring capabilities. In various embodiments, one or more components of the video monitoring service 210 may rely on external systems to provide aspects of the described functionality. In certain embodiments, various aspects of the functionality of the components of the video monitoring service 210 may be provided by components of the communication system 205.

In addition to the monitoring capabilities described herein, the video monitoring service 210 may include various additional monitoring capabilities that may be used in conjunction with the video monitoring capabilities described herein, such as live monitoring of voice and/or video visitation sessions, recording of visitation sessions, archiving stored visitation sessions to a repository 295, keyword detection and searching within text-based communications and transcripts of audio and video communications, voice model generation and voice print matching. In one illustrative example, video monitoring service 210 may include capabilities that utilize speech recognition to convert voice communications to text in order to scan the message for keywords or statements indicative of suspicious activity. In another illustrative example, video monitoring service 210 may also analyze recorded visitation sessions utilizing periodic or continuous voice print matching to identify situations where a visitation session has been illicitly joined by an individual that is not authorized to participate in the communication session.

In the illustrated embodiment, the video monitoring service 210 interfaces with the communications system 205 to provide monitoring of video communication services provided to residents. In certain scenarios, the monitored video communications may be video visitation sessions in which a resident participates using a resident terminal 215a, similar to the resident communications terminal 120 of FIG. 1. In certain scenarios, the monitored video communications may be video visitation sessions in which a resident participates using a portable device 215b, similar to the portable communications device 125 of FIG. 1. In other scenarios, the monitored communications may be other types of video communications in which a resident participates using any communication device capable of allowing a resident to participate in video communications.

The video monitoring service 210 may include capabilities for monitoring the live video feeds of a visitation for indications of high-priority events indicating non-verbal communications and/or inappropriate behavior, while also recording the live video feeds for additional post-processing. In the embodiment of FIG. 2, the video monitoring service 210 includes a live video recording module 225 that captures the streaming video feeds from each of the participants in a video visitation session. In certain embodiments, the video recording module 225 may generate a locally-stored recording of the live video feed that is then transferred to a data repository 295 once the video visitation is completed and the file to which the video is stored has been finalized. In certain embodiments, the video recording module 225 may buffer the captured video and periodically store portions of the video to the data repository 295.

In addition to recording the live video session to the data repository 295, the video monitoring service 210 provides the ability to perform an initial processing of the live video streams. In the illustrated embodiment, the live video processing system 230 provides the capabilities for performing this initial processing of the live video. In certain embodiments, the live video processing module may perform the initial processing of the live video as it is buffered by the live video recording module 225. In such embodiments, the video data may be processed by the live video processing system 230 as long as the video data remains buffered by the recording module 225. In this manner, the video data may be processed without delaying the recording processes and without generating an additional copy of the video data, which would consume additional processing and memory resources.

As illustrated, the live video processing system 230 may utilize various sub-components in performing the initial processing of the captured video data. In certain embodiments, individual frames of the video feed may be sampled for analysis by a frame capture module 235. The frame capture module 235 may be configured to increase or decrease the frequency of frame samples. For instance, the frame capture module 235 may be configured to alter the frequency of frame captures from a video feed based on a privilege classification of the resident participating the visitation session. Video feeds for high-risk inmates may be sampled for frame captures with a high frequency, while lower sampling rates may be used for low-risk inmates. Privilege status may be based on criminal history or their behavior while in the controlled environment facility. For instance, if an inmate is a chronic offender of bad behavior while on video visitation, they may have a flag notated on their account which may prompt the system to sample at a higher rate. Location of the inmate may be another variable that determines sample rate. If inmates are housed together for similar charges, the system may look at the housing assignment to determine the sampling rate. The sampling rate utilized by the frame capture module 235 may also be modulated in response to inputs to the monitoring system indicating a resource exhaustion in the communications processing system described with respect to FIG. 4.

The sampled frames may be analyzed by the live video processing system 230 to detect events of interest within the live video visitation. In the illustrated embodiment, an image analysis module 240 is utilized to evaluate the individual frames that are sampled. The image analysis module may implement a variety of image processing techniques that may be used to detect indications of non-verbal communications and/or inappropriate behavior. In certain embodiments, the image analysis module may utilize the graphics processor 407 described with respect to FIG. 4 in analyzing the sampled frames. In certain embodiments, the sampled frames may be processed in order to detect the display of a paper note or other writing surface by a participant in the video session, which would indicate potential non-verbal communications, or to detect higher than expected skin tone colors, which would indicate potential inappropriate behavior. In certain of such embodiments, a color balance may be calculated for each sampled frame. An initial set of sampled frames may be used to establish a baseline color balance for the video visitation session. In certain embodiments, the color balance baseline may be stored by a video annotation module 260 as annotations to the recorded video visitation.

Once a color balance baseline has been established, the image analysis module 240 may be utilized to identify any frames exhibiting deviations from the color balance baseline. In the illustrated embodiment, a color change detector 250 may be utilized to evaluate whether the color balance changes identified by the image analysis module 240 correspond to the possible display of a non-verbal message and/or inappropriate behavior. For instance, in a scenario where a sudden and significant change in the color balance is detected, the color change detector 250 may signal the potential display of a message surface or excessive skin area within the live video feed. The color change detector 250 may be trained using especially-created video tests to recognize color balance changes that indicate the display of different types of message surfaces, such as different types and colors of paper notes. Alternatively, the color change detector 250 may be trained to recognize color palettes that correspond to human skin tones, which may indicate the display of a participant's body parts. The color change detector 250 may also be trained to distinguish such message display and inappropriate behavior scenarios from gradual color balance changes that indicate a natural change in lighting in the room utilized by a visitation participant.

Color change detector 250 may detect deviations in the color balance of the live video feed, and the live video processing system 230 may classify certain of these deviations as high-priority events. For instance, the color change detector 250 may detect a change in the color balance that indicates a high likelihood that a paper message or a body part is being displayed within the video feed. In certain embodiments, the detection of a high-priority event may be signaled via an alert issued by an alert and notification module 265. In such embodiments, the alert may be transmitted to an administrative interface supported by the video monitoring service 210. Being generated by the live video processing system 230, the alert may be generated and provided to staff in near real-time with the occurrence of the high priority event. Accordingly, in response to the alert, staff may commence live monitoring of the video visitation.

In certain embodiments, the live video processing system 230 may also utilize a movement detection module 245 to identify movement within a monitored live video feed. In certain of such embodiments, the live video feed may determine indications of movement based on changes in a frame rate used transmit the live video feed. In certain scenarios, lower frame rates may be used in portions of a video feed that include relatively few movements, while higher frame rates may be utilized to capture movements during portions of the video feed that show higher activity. In certain embodiments, the movement may be determined by the movement detection module 245 by utilizing pixel comparisons between successive frames sampled from the live video feed. In certain embodiments, movement within a portion of a video feed may be determined based on the efficiency at which the portion is compressed by the video codec. Video segments that include little movement by participants may be compressed efficiently, while segments including greater amounts of movement require greater bandwidth for transmission and may be compressed less efficiently. In certain embodiments, the compression efficiency may be determined by the movement detection module 245 based on information provided by the codec used to compress the video feed. In certain embodiments, the compression efficiency may be determined from the computational workload of the video processor, such as video processor 417 of FIG. 4, and its processes used to compress and decompress video streams.

In certain embodiments, an initial portion of the live video feed may be analyzed for movement in order to establish a movement baseline for a participant in a video visitation. In such embodiments, the detection of movements may be determined based on deviations from the established movement baseline. In this manner, isolated periods of movement by participants may be identified as opposed to detecting regular movements by participants that may naturally converse using lots of hand motions or other gesticulations.

When movement detection module 245 identifies an event showing excessive movement by one of the participants, this event may trigger additional monitoring or processing by color change detector 250, for example, when such excessive movement might indicate adjustment or removal of the participant's clothing. The excessive movement may be defined as motion that deviates from the baseline level by a threshold amount.

Similar to the described alerting of high-priority message or behavior indications, the movement detection module 245 may similarly classify detected movements as high-priority events that may be alerted via the alerts and notifications system 265. For instance, the detection of a sequence of rapid movements in a visitation session with otherwise few movements may be indicated as an alert for immediate monitoring. Also similar to the annotation of color balance changes, the movement detection module 245 may also utilize the video annotations module 260 in order to flag locations of detected movement within the video feed for additional post-processing at these identified locations in the video feed.

All events of interest, including the described color balance changes and movement indicators, that are detected by the live video processing system 230 may be noted within annotations to the recorded visitation by the annotation module 260. For instance, each high-priority change in the color balance detected by the color change detector 250 may be included in the annotations as flag requesting staff review and/or designating that portion of the video visitation for further post-processing analysis. The color change detector 250 may also flag all other detected regular-priority color balance changes as annotations to be made by the video annotation module 260, where the locations of these regular-priority events also indicating portions of the video visitation for further post-processing. In this manner, the annotations generated during processing of the live video feeds may be utilized as starting points in the post-processing analysis of the recorded video feed.

Once the video visitation session has concluded, the live video recording module 225 may finalize the generated video files for storage to video repository 295. In certain embodiments, the finalization of the video files by the live video recording module 225 may include indexing the video files with the locations of the annotations generated by the live video processing system 230. With the recording of the video visitation finalized, the video monitoring service 210 may commence post-processing of the stored video file to identify indications of non-verbal communication or inappropriate behavior.

In the illustrated embodiment, the video monitoring service 210 utilizes a video post-processing system 255 for more intensive analysis of a stored video feed. The post-processing system 255 may process a stored video feed immediately after the video feeds has been recorded or post-processing may be scheduled for a later time, such as during periods of resource availability by the communications processing system of FIG. 4. In certain embodiments, the post-processing system 255 may process a stored video feed using the annotations made during the live processing of the video feed. As described, the live video feed may flag the stored video feed at locations corresponding to detected events of interest, such as changes in the color balance or movements indicating non-verbal communications or inappropriate behavior. In certain embodiments, the post-processing system 255 may be configured to additionally process the portions of the stored video feed that were annotated by the live processing of the video feed.

The post-processing 255 may utilize a video segment selection module 270 to select the portions of the stored video feed for post-processing analysis. The video selection module may select portions of the stored video feed based on the annotated locations that were flagged during the live video processing. For instance, the video segment selection may select a portion of the stored video that begins immediately before a flagged location in the stored video and ends immediately after a flagged location. In other scenarios, the video segment selection may select a portion of the stored video that begins at or immediately precedes a flagged location in the stored video and ends at or immediately after the next flagged location in the stored video, thus combining the two flagged locations in a single video segment for post-processing analysis. In this manner, portions of stored video may be selected for additional analysis while utilizing the annotations from the live processing of the video.

The portions of the stored video selected for post-processing may be analyzed by a message surface detection module 275 that is configured to search the frames of the selected portion of the video for indications of the display of a message surface, such as a paper note. As described, changes in the color balance in successive frames sampled during live processing of the video feed may indicate the display of a note. In certain embodiments, post-processing by the message surface detection module 275 may implement a similar color balance detection process throughout the portion of the video selected by the segment selection module 270. The change in color balance detected during live processing of the video is determined based on processing of sampled frames of the video. Consequently, the display of a note in the video feed may be correctly detected in live processing, but neighboring frames in the video that were not sampled during live processing may provide a better image of the displayed note. Accordingly, in certain embodiments, the post-processing of the selected video segment by the message surface detection module 275 may utilize a higher sampling rate than used in live processing to detect the frame with the greatest color balance deviation from the baseline established for the video feed.

In this manner, the message surface detection module 275 may select frames in the video feed segment for additional post-processing analysis, in particular to identify the display of a message surface. In certain embodiments, frames selected for further post-processing may be processed to identify the predominate color of the identified color balance deviation in an attempt to isolate the displayed note within the frame. In certain embodiments, the message surface detection module 275 may isolate a message surface displayed within a frame by cropping portions of the frame that vary from the predominate color of the color balance deviation. By cropping such portions of the frame, notes displayed during a video feed may be isolated from any background that is also visible within the frame, such as the participant and the room or area within the view of the participant's video camera.

Post-processing of the video may also utilize a character and text recognition module 280 in processing images of potential message surfaces that have been cropped from frames. Recognition may include various pre-processing of the message surface images, such as addition cropping and techniques to better isolate the markings on the note from the background of the note itself, and techniques for determining the size and orientation of the characters. The character and text recognition module 280 may then employ a variety of techniques for determining whether any characters or text are displayed on the suspected message surface. For instance, attempts may be made to identify any character on the message surface using pattern and/or shape matching recognition techniques and also using handwriting recognition models. In certain embodiments, utilized handwriting recognition models may be generated based on the monitored paper correspondence of a resident. If any characters are identified on the message surface more robust recognition technique may be utilized, including recognition of all text that can be identified on the note.

In order to identify the use of hand-signal communications in post-processing, certain embodiments utilize a hand signal detection module 285 that is configured to analyze segments of the recorded video that have been flagged as including movement by one of the participants. Similar to the process for isolating displayed notes, the video segment selection module 270 may likewise select segments of a recorded video that have been flagged and annotated as including movement during live-processing of the video feed. The video segment selection module 270 may similarly select segments of video for hand signal detection that start from the locations that have been flagged as including movement. The video segment selection module may choose additional frames before and/or after the flagged movement locations and may combine closely-separated flagged locations into single segments for post-processing.

The hand signal detection module 285 may process these selected segments for indications of the display of hand signals in the video feed. Certain embodiments may sample and process frames from the selected segment to isolate the participant's skin color from the background colors present in the frame. In scenarios in which the participant can be distinguished from the background, the hand signal detection module 285 may process successive frames of selected segment to isolate an area of the video feed in which motions by the participant can be isolated from a background. Facial recognition techniques may be utilized to isolate and omit facial movements from the analysis. In certain embodiments, the hand signal detection module 285 may utilize various libraries of hand signals in pattern matching against the hand positions captured and isolated within analyzed frames of the selected video feed segment. In this manner, the hand signal detection module 285 may identify hand movements that are consistent with the use of hand signals in non-verbal communications.

In order to identify inappropriate behavior, such as a participant exposing themselves during a video visitation session, certain embodiments utilize a skin exposure detection module 290 that is configured to analyze segments of the recorded video that have been flagged as including color changes associated with one of the participants. The video segment selection module 270 may select segments of a recorded video that have been flagged and annotated as including color changes that included a high level of skin tone colors during live-processing of the video feed. The video segment selection module 270 may similarly select segments of video for skin exposure detection that start from the locations that have been flagged as including excessive movement by a participant.

The skin exposure detection module 290 may process these selected segments for indications of inappropriate behavior, such as nudity or the flashing body parts, in the video feed. Certain embodiments may sample and process frames from the selected segment to isolate the participant's skin color from the background colors present in the frame. In scenarios in which the participant can be distinguished from the background, the skin exposure detection module 290 may process successive frames of selected segment to isolate an area of the video feed in which motions by the participant can be isolated from a background. Facial detection and/or recognition techniques may be utilized to isolate a particular participant's face from which a target skin tone range may be determined. This target skin tone range can be used to determine whether skin exposure may have occurred in other sections of the video, such as a sudden rise or change in similar skin colors below the region of the participant's face. The skin exposure detection module 290 may utilize various libraries of skin tones for pattern matching against the colors identified in frames of the selected video feed segment.

In other embodiments, the operations described in connection with post-processing system 255 may be performed in real time. In such embodiments, messages, text, hand signals, or inappropriate behavior may be detected while a video communication is still in progress. Such events are sent to alerts and notification module 265, which may flag the video communication for recording, notify facility staff of the event, obscure all or part of the offending video signal if the communication is allowed to continue, and/or terminate the video communication.

FIG. 3 is a flowchart diagram providing certain steps of a process, according to various embodiments, for monitoring communications that include video in order to detect instances of non-verbal communication or inappropriate behavior by participants within the video feed of the communications. In certain embodiments, certain aspects of the video monitoring process may be implemented via a video monitoring service 175, 210, such as described with respect to FIGS. 1 and 2, respectively. The process begins at step 305 with the authentication of a resident requesting a live video visitation service. As described with respect to FIG. 1, a controlled-environment facility may provide residents with the ability to participate in live video visitation sessions with non-residents. The resident may utilize a communications device configured to allow residents to participate in video visitation sessions, such as the resident terminal 120, 215*a* and portable communication device 125, 215*b* described with respect to FIGS. 1 and 2.

At step 305, the resident requesting participation in a video visitation session may be authenticated using capabilities of the communications device. For instance, a resident requesting a video visitation session via a portable communications device 125, 215*b* may be authenticated using one or more biometric verifications supported by the portable communication device, such as fingerprint scanning and/or voice print recognition. In another embodiment, a resident utilizing a resident terminal 120, 215*a* may be authenticated using an RFID (Radio Frequency Identification) reader integrated into the resident terminal, where the RFID reader identifies the resident based on an RFID chip worn by the resident via an ankle bracelet or other non-removable monitoring device.

If the resident is successfully authenticated, at step 310, the requested live video visitation session is conducted. In certain embodiments, the live video visitation session may be hosted by a communications processing system 105 such as described with respect to FIG. 1. As described, the resident may participate in the hosted live video visitation via a supported communication device. In certain scenarios, the resident may participate in a live video visitation with one non-resident. In such scenarios, the live video feed captured by the camera of the non-resident device is shown in the display of the resident's communication device. In other scenarios, the resident may participate in a live video visitation with multiple non-residents. In such scenarios, multiple video feeds may be shown in the display of the resident's communication device, where each of the multiple video feeds may display a video feed captured by the devices of one of the non-resident participants. In certain embodiments, the participating non-residents may likewise be provided with a video feed captured by the camera of the resident's device. In this manner, residents and non-residents may view live video of each other during the video visitation.

At step 315, a recording of the conducted live video visitation session is initiated. The live video visitation may proceed without interruption while the video visitation is simultaneously recorded. Separate recordings may be generated to capture each of the video feeds captured by each of the different participants in the video conference. As described in additional detail, during the recording of the live video visitation feed, the recording may be simultaneously indexed and/or annotated to reflect the events of interest identified in the processing of the live video visitation feed.

With the recording of the live video visitation feed initiated, at step 320, the live video visitation is conducted and the video monitoring system processing the video visitation feed in order to detect events indicating movements of interest by a participant in a live video visitation session. Each of the video feeds of a live video visitation session may be separately analyzed in order to identify movements of interest by participants in the video visitation. A video feed may be processed in order to detect any indications that participants are exchanging non-verbal communication or engaging in inappropriate behavior. For instance, in certain embodiments, the live video feed may be processed to detect instances where messages written on paper are being displayed within the video feed or where a participant is nude or flashing. In such embodiments, the display of a paper message or other inappropriate behavior may be detected based on detected changes in the color balance of the live video stream. For instance, individual frames may be periodically captured from the live video feed and a color balance may calculated for each of the frames captured from the video feed.

In certain instances, changes in the color balance of a monitored video feed may indicate a paper message being displayed within the video feed, such as a video visitation participant displaying a hand-written note for the other participant(s) to view. For instance, a participant displaying a note that has been written, typed, or drawn on a white piece of paper would result in the color balance of the video feed changing to color intensities indicating additional white in the video feed. Likewise, a visitation participant displaying a note on a yellow piece of paper would result in the color balance of the live video feed changing to color intensities indicating additional yellow in the video feed. In certain scenarios, the live video may also detect the display of notes written on the body of a participant, such as a message written on the hand of a participant. In such embodiments, the display body part used as a message surface may be indicated in a shift in the color balance that matches the color balance of the skin tone of the participant. Similarly, the detection of increased or excessive skin tone in the video signal may indicate inappropriate behavior by a participant.

In certain embodiments, the live video feed may be processed at step 320 to detect movements by a participant in a monitored video feed. In certain instances, the detected movement by a participant may indicate the participant presenting a written or other non-verbal message within the video feed for other participants to view. As described, a message presented during a video feed may be a message written or otherwise recorded on paper. A message may also be a note written on the body of a participant. In various scenarios, a message may be written on any suitable surface that may then be displayed by a participant. The detection of movement by a participant may indicate the participant displaying any such written surface in the video feed for other participants to view. Excessive movement by a participant may also indicate that inappropriate behavior occurred, such as the removal or shifting of clothing.

In addition to indicating the display of a written message, movements by a participant in the video visitation may indicate hand signal communications by a participant. For instance, a participant may communicate non-verbally with other participants by displaying hand signals, such as gang signs, or by using any other form of sign language or gestures. By detecting certain types of movements by participants, such hand signal communications may be identified. The display of hand signals may be distinguished from normal participants movements, such as an individual crossing their arms, based on the rapidness of the movement and whether the movements are followed by successive, equally rapid movements. Movement may be detected during processing of the live video feed at step 320 as described above with regard to FIG. 2, such as by determining the frame rate used to transmit a portion of a video feed, the detection of changing pixels in successive frames and/or based on the efficiency of the compression and decompression of the video feed.

At step 325, an alert may be issued in response to the detection of certain high-priority movements or changes in the monitored live video feed. For instance, in scenarios where a detected change in the color balance of the video feed indicates a high likelihood of a paper note being displayed within the video feed such that the note obscures a large portion of the video feed and skews the color balance of the video feed significantly towards a solid color. In another scenario, an alert may be issued based on the detection of a series of rapid movements, thus indicating a high likelihood of the use of hand signal communications or the occurrence of furtive or inappropriate behavior. In certain embodiments, the alert may be issued at step 325 within a user interface supported by the monitoring system. The issued alert may include a link to a location in the recorded version of the video feed at which the high-priority movement or change has been detected. Using the link provided in the alert, a user may navigate directly to the location in the recorded video that corresponds to the detected high-priority movement or change.

The alert may further include a feedback mechanism by which the user can confirm whether the alerted event does correspond to the detection high-priority event, whether the alerted event is an event of interest, but is not a high-priority event, or whether the high-priority event is not event of interest. Any such confirmation by the user may be communicated to the monitoring system. The monitoring system may update the annotations of the recorded video feed in order to reflect the input from the user. For instance, a confirmed high-priority event may be designated as such in the annotations. If the user confirmation indicates the detected high-priority event is not an event of interest, the corresponding annotation in the recorded video feed may be removed, thus un-designating this portion of the video feed from further analysis via post-processing. In such scenarios, an alerted event that has been un-designated by a user may remain flagged as a detected event in order to maintain the integrity of the official record. In certain embodiments, the user confirmation may be utilized by the monitoring system to update one or more settings, such as threshold values, that may be used in configuring the detection and classification of detected events as high-priority events.

Once movements or changes of interest are identified, at step 330, the recorded version of the monitored video feed may be annotated with flags indicating the locations of all events detected in the recorded video, including the alerted high-priority events and all other detected events that were not classified as high-priority events. In certain embodiments, such flags may serve as annotations indicating the locations for additional post-processing analysis of the video feed. As described below, additional processing of these portions of the video feed using more robust analysis techniques may be utilized to confirm the presence of a non-verbal communication in this portion of the video feed, or at least confirm the detected events as events of interest.

At step 335, the live video visitation session is completed when all participants are disconnected such that the communications processing system is no longer sending or receiving any video feeds from any of the participants. At this point, the recordings of the live video feeds may be finalized, and post-processing may commence. The finalized recordings may be indexed to reflect the locations of the events and changes identified during the processing of the live video feed. In certain embodiments, each finalized recording may be a video file that is stored to a repository that is accessed by the monitoring system, such as repository 295 described with respect to FIG. 2.

Post-processing of the recorded video feeds may be conducted at step 340. In certain embodiments, post-processing of the video feed may begin at the annotated locations in the video feed that were flagged as indicating possible non-verbal communications, such as the display of a written note or hand signals. As described, a post-processing system may expand the post-processing analysis to segments of video feed immediately before and after the flagged locations in order to expand the search for frames displaying non-verbal communication or inappropriate behavior. In addition, the post-processing may employ more computationally intensive techniques in isolating non-verbal communication or inappropriate behavior. As described, high sampling rates may be utilized to analyze the video feed at a greater fidelity than utilized in the live processing of the video feed. In addition, computationally intensive techniques may be used to isolated message surfaces and movements and character and gesture recognition may be utilized to identify the display of non-verbal messages or inappropriate behavior.

At step 345, notifications and alerts may be generated based on the results of the post-processing. In certain embodiments, post-processing may classify certain detected events as high-priority events for which alerts may be issued. For instance, if post-processing identifies the display of a written message in a video feed and is able to recognize the text of the message, such text may be included within an alert. In some embodiments, the text may be ignored if it can be identified as incidental text, such as the name of a sports team printed on the shirt of a participant. Alerts may similarly be issued for other high-priority detections, such as the detection of inappropriate behavior or identifying hands signals using a library of gestures. All detected events may be thus categorized and included within a notification providing staff with the locations and types of detected events and links to these annotated locations, thus allowing manual review and confirmation of the detected events.

FIG. 4 is a block diagram of a communication processing system 400 configured according to certain embodiments to support the described voice messaging system. Communication processing system 400 may include one or more processors 401. In various embodiments, communication processing system 400 may be a single-processor system including one processor 401, or a multi-processor system including two or more processors 401. Processor(s) 401 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communication processing system 400 includes a chipset 402 that may include one or more integrated circuits that are connected to processor(s) 401. In certain embodiments, the chipset 402 may utilize a QPI (QuickPath Interconnect) bus 403 for communicating with the processor(s) 401. Chipset 402 provides the processor(s) 401 with access to a variety of resources. For instance, chipset 402 provides access to system memory 405 over memory bus 404. System memory 405 may be configured to store program instructions and/or data accessible by processors(s) 401. In various embodiments, system memory 405 may be implemented using any suitable memory technology, such as static RAM (SRAM), synchronous dynamic RAM (SDRAM), nonvolatile/Flash-type memory, or any other type of memory.

Chipset 402 may also provide access to a graphics processor 407. In certain embodiments, graphics processor 407 may be comprised within one or more video or graphics cards that have been installed as components of the communication processing system 400. Graphics processor 407 may be coupled to the chipset 402 via a graphics bus 406 such as provided by an AGP (Accelerated Graphics Port) bus or a PCIe (Peripheral Component Interconnect Express) bus. In certain embodiments, graphics processor 407 generates display signals and provides them to a display device 408 that may be coupled directly to the communication processing system 400 or may be located remotely from the communication processing system 400.

In certain embodiments, chipset 402 may also provide access to one or more user input devices 411. In such embodiments, chipset 402 may be coupled to a super I/O controller 410 that provides interfaces for a variety of user input devices 411, in particular lower bandwidth and low data rate devices. For instance, super I/O controller 410 may provide access to a keyboard and mouse or other peripheral input devices. In certain embodiments, super I/O controller 410 may be used to interface with coupled user input devices 411 such as keypads, biometric scanning devices, and voice or optical recognition devices. The user input devices 411 may interface with super I/O controller 410 through wired or wireless connections. In certain embodiments, the super I/O controller 410 may be coupled to the super I/O controller 410 via a Low Pin Count (LPC) bus 413.

Other resources may also be coupled to the processor(s) 401 of the communication processing system 400 through the chipset 402. In certain embodiments, chipset 402 may be coupled to a network interface 409, such as provided by a Network Interface Controller (NIC) that is coupled to the communication processing system 400. In certain embodiments, the network interface 409 may be coupled to the chipset 402 via a PCIe bus. According to various embodiments, network interface 409 may support communication via various wired and/or wireless networks. Chipset 402 may also provide access to one or more hard disk and/or solid state drives 415. In certain embodiments, the chipset 402 may also provide access to one or more optical drives 414 or other removable-media drives. Any or all of the drive devices 414 and 415 may be integral to the communication processing system 400 or may be located remotely from the communication processing system 400. In certain embodiments, the chipset 402 may also provide access to one or more Universal Serial Bus (USB) ports 416.

In various embodiments, a communication processing system 400 does not include each of the components shown in FIG. 4. In various embodiments, a communication processing system 400 may include various additional components in addition to those that are shown in FIG. 4. Furthermore, some components that are represented as separate components in FIG. 4 may in certain embodiments instead be integrated with other components. For example, in certain embodiments, all or a portion of the functionality provided by the illustrated components may instead be provided by components integrated into the one or more processor(s) 401 as a systems-on-a-chip.

FIG. 5 illustrates an example system for identifying color changes in a video communication, which may indicate inappropriate behavior such as nudity or flashing. An image processor 501 receives an image 502, which may be a frame captured from a video communication session. Image 502 comprises a plurality of pixels 503 that are arranged in a two-dimensional array. Each pixel stores color information for image 502. In some embodiments, the color information may be stored in either three components known as RGB (Red, Green, Blue) or four components known as CMYK (Cyan, Magenta, Yellow, blacK). The number of distinct colors represented by each pixel depends on the number of bits per pixel that are stored. The actual number of bits used to represent the color of a single pixel may be referred to as color depth.

Image processor 501 analyzes image 502 and detects a region 504 that includes a face for one of the participants 505 on the video communication. Image processor 501 may detect region 504 by applying a known face-detection algorithm or by searching for a group of pixels 503 that correspond to known or expected skin tones. A database 506 comprises a library of known or common skin tones, which may be correlated to the color depth of pixels 503 to identify a face within region 504. Once region 504 is identified, image processor 501 may generate a target skin tone range for participant 505. In one embodiment, the target skin tone range may comprise a list of skin tone colors detected in region 504. In another embodiment, an average skin tone value may be calculated for region 504, and the target skin tone range may comprise the group of skin tone colors centered around that average value.

Image processor 501 may then use the target skin tone range to search the rest of image 502 for additional skin tones. If image processor 501 detects a large area 507 of skin tone colors that match the target skin tone range, then that region 507 may be flagged as a potential area of exposed skin. Upon detection of such region 507, image processor 501 may report image 502 to a video monitoring service 508, such as video monitoring service 210 in FIG. 2. In one embodiment, for example, image processor 501 may be a component of an image analysis module 240 or a color change detector module 250 that receives one or more images 502 from a frame capture module 235.

Image processor 501 may analyze a series of related images 502, such as a sequence of frames captured from a video communication at predetermined intervals. Image processor 501 may compare each image 502 to a previous image to determine if colors have changed from one image to another and, if so, to what degree the colors have changed. In particular, image processor 501 may determine if skin tone colors suddenly appear or significantly increase form one image 502 to the next. Such changes may indicate inappropriate behavior, such as removal or shifting of clothing to expose body parts.

In another embodiment, instead of identifying a target range of skin tones, image processor may mark all regions 503, 507 in image 502 that correlate to known or expected skin tones. The marked regions 503, 507 may be compared to a library of known body features 506 that may be properly or improperly exposed during a video communication, such as faces, shoulders, arms, hands, genitals, breasts, buttocks, etc. If a marked region 503, 507 matches a body feature (e.g., contains a predefined form, shape, or profile), then image processor may report the image 502 to the video monitoring service 508 if the body feature is noted as improper or inappropriate.

Image processor 501 may operate on pixels 503 that fall within either visible or invisible frequencies. For example, a typical video camera may be used to capture images of the participants, which creates pixels that correspond to frequencies that can be observed with the human eye. Alternatively, or additionally, the camera may be part of a thermographic or thermal imaging system that is used to measure skin surface temperature. These systems include, for example, an infrared thermal camera. In such systems, pixels 503 represent detected heat values. A participant's face and hands are likely to correspond to an exposed skin heat level, but the rest of the participant's body would typically have a lower heat level due to being covered by clothing. If the image processor 501 detects other regions on the body of participant 505 that have an exposed skin heat level, then that region may be identified as exposed skin. Depending on where the exposed region is located on the participant's body, the image processor 501 and/or video monitoring service 508 may determine that inappropriate behavior is occurring.

In some embodiments, image processor 501 may use face detection to identify more than facial region 504 in the image 502. The presence of more than one region 504 indicates that more than one face is present in the video. In some facilities, the presence of multiple residents on the video feed may not be allowed, such as to prevent residents from contacting persons who are not on the resident's PAC or PAN list. The presence of multiple residents may be considered inappropriate behavior, which may cause the video feed to be shut down and/or an alert to be sent.

The age of the participant 505 may also be relevant. For example, a resident may be restricted from communicating with minors. In one embodiment, image processor 501 may detect facial features within region 504, such as eyes and pupils on the participant. Image processor 501 may use pupil detection or similar technology to determine an approximate age of the participant 505, such as the relative size of the participant's face, eyes, or pupils compared to reference samples stored in database 506. The estimated age of the participant may be compared to an expected age of the person who is scheduled for the video communication. If the estimated age of the participant does not match the expected person's age or does not meet a minimum age, then the video feed may be terminated, the video conference recoding may be marked for review, and/or an alert to be sent to facility staff to observe the communication session.

Image processor 501 may compensate for variations in a participant's skin color, such as suntan, makeup, or other effects, when detecting exposed skin. For example, the participant's face may have a darker shade than other body parts due to sun exposure, which may create tan lines or other discontinuities in skin tone in image 502. Image processor 501 may identify an initial skin tone for participant 505 using facial region 504. Image processor 501 may then search for additional exposed skin using a broader palette that includes lighter tones to identify skin area 507 that has not been exposed to the sun as much as the participant's face and, therefore, may not be tanned.

In some embodiments, video monitoring service 508 may be continuously monitoring the video communication session, such as by periodically sampling frames captured from a video communication at predetermined intervals. This likely would result in a high volume of wasted processing power and time spent analyzing random images. In other embodiments, the image processor 501 may be triggered by other events during the video communication, such as the occurrence of certain words or phrases, changes in the participant's vocal tone or volume, or detection of sounds consistent with a clothing rustle sound. These events may indicate that a participant is shifting or adjusting clothing and may be behaving inappropriately. Upon detection of such events, image processor 501 may be engaged to analyze images from the video feed immediately adjacent in time to the event, which may increase the likelihood of catching inappropriate behavior during the video session.

In addition to sending warnings or alerts to facility staff, the video monitoring service may additionally, or alternatively, send warnings to the participants if inappropriate behavior or non-verbal communication is detected. For example, a warning or notice may be displayed to the participants indicating that inappropriate behavior or non-verbal communication are not allowed and may result in termination of the communication session.

The ability of image processor 501 to detect the presence of facial region 504 may be useful in other applications. Some facilities may require that a participant always be present. If a participant is not observed for longer than a predetermined duration, such as for twenty seconds, then the video monitoring service 508 may terminate the communication session to allow other residents to use the system. If image processor 501 does not detect a facial region 504 for the predetermined duration, then a warning may be issued to the participant, the communication session may be terminated, and/or an alert may be sent to facility staff. The amount of time required for a participant to be visible may be fixed or variable based upon the individual participant's profile or the facility's default configuration.

An example embodiment is directed to a system for monitoring video communications provided to a resident of a controlled-environment facility comprising a communication system coupled to a video processing system. The communication system is configured to host a live video visitation between the resident and one or more non-residents, wherein the video visitation comprises a plurality of live video feeds. The video processing system is configured to sample a plurality of frames of a first video feed of the plurality of video feeds to detect indications of inappropriate behavior displayed in the first video feed and to trigger a predetermined action when indications of the inappropriate behavior are detected in the first video feed, wherein the inappropriate behavior comprises at least partial nudity. The predetermined action may be one or more of alerting controlled-environment facility staff, terminating the first video feed, and marking the first video feed with an indication that inappropriate behavior is being detected. Indications of inappropriate behavior may be detected based upon the identification of predetermined forms or shapes in one or more frames of the first video feed.

The system may further comprise a video feed recording system that is configured to generate a plurality of video recordings, each video recording corresponding to a video feed of the plurality of live video feeds. The video processing system may be further configured to annotate a first video recording corresponding to the first video feed, wherein the annotations specify the locations of the detected indications of the non-verbal communication displayed in the first video recording.

The resident may be associated with a privilege classification by the controlled-environment facility, wherein the frames are sampled at a frequency determined based on the privilege classification of the resident. A first sampling frequency may be utilized when the resident is associated with a lower-risk privilege classification and a second sampling frequency may be utilized when the resident is associated with a higher-risk privilege classification, wherein the second sampling frequency is higher than the first sampling frequency. The sampling frequency may be further determined based on a state of resource exhaustion by the video processing system.

The video processing system may be further configured to identify a target region in one or more of the plurality of frames, wherein the target region comprises a plurality of pixels having a color depth corresponding to a skin tone, and wherein the video processing system is further configured to detect one or more sampled frames having an increased number of pixels with a color depth corresponding to a skin tone when compared to a prior sampled frame. The video processing system may be further configured to modify the sampling rate based on the identification of the target region.

In another example embodiment, a method for monitoring video communications of a resident of a controlled-environment facility comprises hosting a live video visitation between the resident and one or more non-residents, wherein the video visitation comprises a plurality of live video feeds, and wherein the resident is associated with a privilege classification by the controlled-environment facility, generating a plurality of video recordings, each video recording corresponding to a live video feed of the plurality of live video feeds, sampling a plurality of frames of a first recorded video feed to detect indications of inappropriate behavior displayed in the first video feed, wherein the frames are sampled at a frequency determined based on the privilege classification of the resident, and annotating the first video recording, wherein the annotations specify the locations of the detected indications of the inappropriate behavior displayed in the first video recording.

A first sampling frequency is utilized when the resident is associated with a lower-risk privilege classification, and a second sampling frequency is utilized when the resident is associated with a higher-risk privilege classification, wherein the second sampling frequency is higher than the first sampling frequency. The sampling frequency is further determined based on a state of resource exhaustion by a video processing system.

The method may further comprise determining a color balance for a plurality of the frames sampled from the first recorded video feed and determining a color balance baseline for the first recorded video feed based on the color balances determined for the plurality of the frames.

The method may further comprise identifying a target region in one or more of the plurality of frames, wherein the target region comprises a plurality of pixels having a color depth corresponding to a skin tone.

The method may further comprise detecting one or more sampled frames having an increased number of pixels with a color depth corresponding to a skin tone when compared to a prior sampled frame.

The method may further comprise modifying the sampling rate based on the identification of the target region.

The method may be performed using a computer-readable storage device having program instructions stored thereon for monitoring video communications of a resident of a controlled-environment facility, upon execution by one or more processors, the program instructions cause the one or more processors to perform the method steps.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for monitoring video communications provided to a resident of a controlled-environment facility, the system comprising:
   a communication system configured to:
      host a live video visitation between the resident and one or more non-residents, the video visitation comprising a plurality of live video feeds; and
      a video processing system configured to:
      sample a plurality of frames of a first video feed of the plurality of video feeds to detect indications of inappropriate behavior displayed in the first video feed;
      identify a target region in one or more of the plurality of frames, the target region comprising a plurality of pixels having a color depth corresponding to a skin tone;
      detect one or more sampled frames having an increased number of pixels with a color depth corresponding to a skin tone when compared to a prior sampled frame; and
      trigger a predetermined action when indications of the inappropriate behavior are detected in the first video feed, the inappropriate behavior comprising at least partial nudity.

2. The system of claim 1, wherein the predetermined action is one or more of alerting controlled-environment facility staff, terminating the first video feed, and marking the first video feed with an indication that inappropriate behavior is being detected.

3. The system of claim 1, further comprising:
   a video feed recording system configured to generate a plurality of video recordings, each video recording corresponding to a video feed of the plurality of live video feeds, and wherein the video processing system is further configured to:
annotate a first video recording corresponding to the first video feed, wherein the annotations specify the locations of the detected indications of the inappropriate behavior in the first video recording.

4. The system of claim 1, wherein the resident is associated with a privilege classification by the controlled-environment facility, and wherein the frames are sampled at a frequency determined based on the privilege classification of the resident.

5. The system of claim 4, wherein a first sampling frequency is utilized when the resident is associated with a lower-risk privilege classification and wherein a second sampling frequency is utilized when the resident is associated with a higher-risk privilege classification, and wherein the second sampling frequency is higher than the first sampling frequency.

6. The system of claim 4, wherein the sampling frequency is further determined based on a state of resource exhaustion by the video processing system.

7. The system of claim 1, wherein the video processing system is further configured to modify the sampling rate based on the identification of the target region.

8. The system of claim 1, wherein indications of inappropriate behavior are detected based upon the identification of predetermined forms or shapes in one or more frames of the first video feed.

9. A method for monitoring video communications of a resident of a controlled-environment facility, the method comprising:
hosting a live video visitation between the resident and one or more non-residents, the video visitation comprising a plurality of live video feeds, and wherein the resident is associated with a privilege classification by the controlled-environment facility;
generating a plurality of video recordings, each video recording corresponding to a live video feed of the plurality of live video feeds;
sampling a plurality of frames of a first recorded video feed to detect indications of inappropriate behavior displayed in the first video feed, the frames sampled at a frequency determined based on the privilege classification of the resident;
determining a color balance for a plurality of the frames sampled from the first recorded video feed;
determining a color balance baseline for the first recorded video feed based on the color balances determined for the plurality of the frames; and
annotating the first video recording, the annotations specifying the locations of the detected indications of the inappropriate behavior displayed in the first video recording.

10. The method of claim 9, wherein a first sampling frequency is utilized when the resident is associated with a lower-risk privilege classification and wherein a second sampling frequency is utilized when the resident is associated with a higher-risk privilege classification, and wherein the second sampling frequency is higher than the first sampling frequency.

11. The method of claim 9, wherein the sampling frequency is further determined based on a state of resource exhaustion by a video processing system.

12. The method of claim 9, further comprising:
identifying a target region in one or more of the plurality of frames, wherein the target region comprises a plurality of pixels having a color depth corresponding to a skin tone.

13. The method of claim 12, further comprising:
detecting one or more sampled frames having an increased number of pixels with a color depth corresponding to a skin tone when compared to a prior sampled frame.

14. The method of claim 12, further comprising:
modifying the sampling rate based on the identification of the target region.

15. A method for monitoring video communications of a resident of a controlled-environment facility comprising:
hosting a live video visitation between the resident and one or more non-residents, the video visitation comprising a live video feed;
generating a video recording corresponding to the live video feed;
sampling a plurality of frames of a recorded video feed to detect indications of inappropriate behavior displayed in the video feed;
identifying a target region in one or more of the plurality of frames, the target region comprising a plurality of pixels having a color depth corresponding to a skin tone; and
annotating the video recording, the annotation specifying the locations of the detected inappropriate behavior displayed in the first video recording.

16. The method of claim 15, wherein the resident is associated with a privilege classification by the controlled-environment facility, and wherein the frames are sampled at a frequency determined based on the privilege classification of the resident.

17. The method of claim 15, wherein a first sampling frequency is utilized when the resident is associated with a lower-risk privilege classification and wherein a second sampling frequency is utilized when the resident is associated with a higher-risk privilege classification, and wherein the second sampling frequency is higher than the first sampling frequency.

18. The method of claim 15, further comprising detecting one or more sampled frames having an increased number of pixels with a color depth corresponding to a skin tone when compared to a prior sampled frame.

* * * * *